United States Patent [19]
Saito et al.

[11] Patent Number: 5,026,963
[45] Date of Patent: Jun. 25, 1991

[54] C-TYPE WELDING GUN

[75] Inventors: Jun Saito; Motohisa Suzuki, both of Tokyo, Japan

[73] Assignee: Obara Corporation, Tokyo, Japan

[21] Appl. No.: 561,960

[22] Filed: Aug. 2, 1990

[30] Foreign Application Priority Data

Aug. 9, 1989 [JP] Japan ................ 1-92926[U]

[51] Int. Cl.⁵ .................................... B23K 11/10
[52] U.S. Cl. ........................................ 219/89
[58] Field of Search ....................... 219/86.25, 89

[56] References Cited

U.S. PATENT DOCUMENTS

| | | | |
|---|---|---|---|
| 3,136,879 | 6/1964 | Waltonen | 219/89 |
| 4,410,782 | 10/1983 | Konno et al. | 219/89 |
| 4,861,959 | 8/1989 | Cecil | 219/89 |

Primary Examiner—Clifford C. Shaw
Attorney, Agent, or Firm—Flynn, Thiel, Boutell & Tanis

[57] ABSTRACT

There is disclosed a C-type welding gun provided with an air cylinder, an equalizer disposed over the air cylinder, a yoke disposed aside the air cylinder and the equalizing unit, a welding transformer disposed over the equalizer. Each of the air cylinder, the equalizer, the welding transformer, the yoke is a separate unit and the resultant each unit is replaced individually with other units with ease.

6 Claims, 3 Drawing Sheets

FIG. 2
FIG. 3
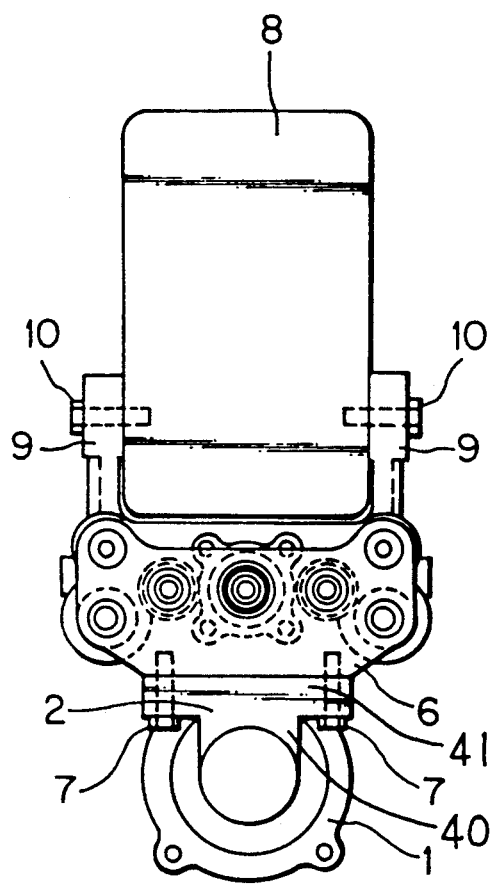
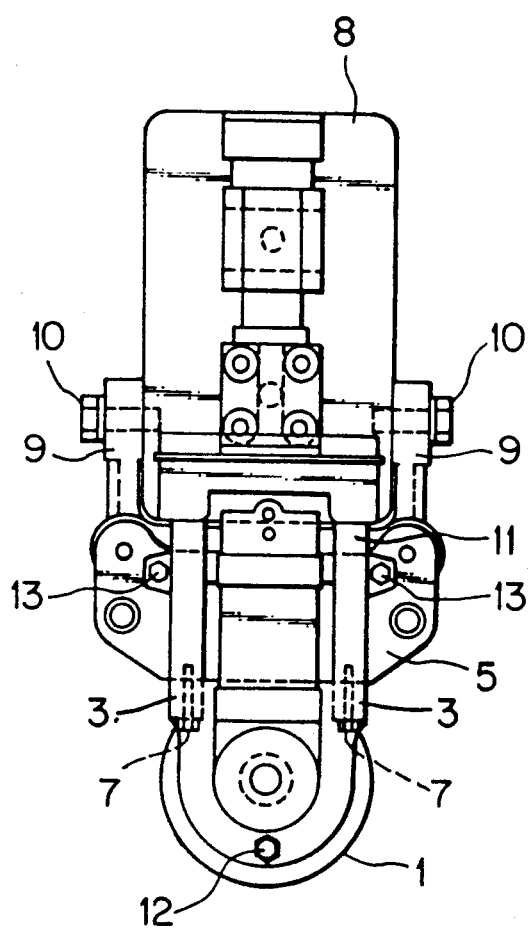

C-TYPE WELDING GUN

BACKGROUND OF THE INVENTION

1. Field of the Invention

The present invention relates to a C-type welding gun provided with an air cylinder, an equalizer disposed over the air cylinder, and a welding transformer disposed over the equalizer.

2. Description of the Prior Art

FIG. 4 shows an arrangement of a prior art C-type welding gun.

The C-type welding gun as illustrated in FIG. 4 comprises an equalizer 21 having a shaft 27 and a rear wall 22 at the rear portion of the shaft 27, an air cylinder 23 having a supporting plate 24 at the rear portion thereof for supporting the equalizer 21 and a front end protruded upward to form a front wall 26 of the equalizer 21, the rear wall 22 of the equalizer 21 being placed on the supporting plate 24 and both the rear wall 22 and the supporting plate 24 being screwed by the bolt 25, 25, a yoke 28 disposed aside the equalizer 21 and the air cylinder 23, the shaft 27 of the equalizer 21 fixed to the front wall 26 of the equalizer 21 and the yoke 28 being retained on the shaft 27 by nuts, 29, 29, and a welding transformer 30 being fixedly mounted on the equalizer 21 by bolts 31, 31.

However, the C-type welding gun having such structure has the following problems.

When the air cylinder 23 is to be replaced with another cylinder in response to the variation of work, firstly the welding transformer 30 is removed from the equalizer 21 by removing the bolts 31, secondly the yoke 28 is removed from the front wall 26 of the equalizer 21 by removing the nuts 29, 29 and at the same time the shaft 27 is removed from the front wall 26, thirdly the rear wall 22 of the equalizer 21 is removed from the supporting plate 24 of the air cylinder 23 by removing the screws 25, 25. Likewise, when the yoke 28 is replaced with another one, the yoke 28 is removed from the shaft 27 by removing the nuts 29, 29. In any event, it is troublesome to replace the air cylinder 23 or the yoke 28.

Inasmuch as the equalizer 21 is disassembled when the air cylinder 23 and the yoke 28 are replaced with other ones, it was hardly possible to assemble the equalizer 21 with high accuracy.

SUMMARY OF THE INVENTION

The present invention has been made to solve the problems of the prior art.

It is therefore an object of the present invention to provide a C-type welding gun having a welding transformer, an equalizer, an air cylinder and a yoke which are respectively separate units which can be replaced individually so that the optimum C-type welding gun can be selected in response to the variation of the work within a short period of time.

To achieve the above object, a C-type welding gun comprises a welding transformer, an equalizer for slidably holding the welding transformer, the equalizer composed of a shaft, a welding transformer holding member slidably mounted on the shaft, and front and rear walls respectively fixing the shaft therebetween, an air cylinder fixed to the equalizer and having a piston rod, and a yoke fixed to both the equalizer and the air cylinder, characterized in that each of the air cylinder, the equalizer, the welding transformer and the yoke is a separate unit, the welding transformer being fixed to the transformer holding member by screwing two bolts to the transformer holding member, the front and rear walls of the equalizer being placed on T-shaped supporting plates mounted on the air cylinder at front and rear portions thereof, the T-shaped supporting plates being fixed to the front and rear walls by screwing bolts upwardly through the supporting plates and into the lower portions of the front and rear walls, the yoke being fixed to the equalizer by screwing bolts to the front wall of the equalizer and being fixed to the air cylinder by screwing bolts to the front portion of the air cylinder.

The above and other objects, features and advantages of the present invention will become more apparent from the following description taken in conjunction with the accompanying drawings.

BRIEF DESCRIPTION OF THE DRAWINGS

FIG. 2 is a rear elevation of FIG. 1;

FIG. 3 is a front elevation of FIG. 1; and

PREFERRED EMBODIMENT OF THE INVENTION

Figure 1:
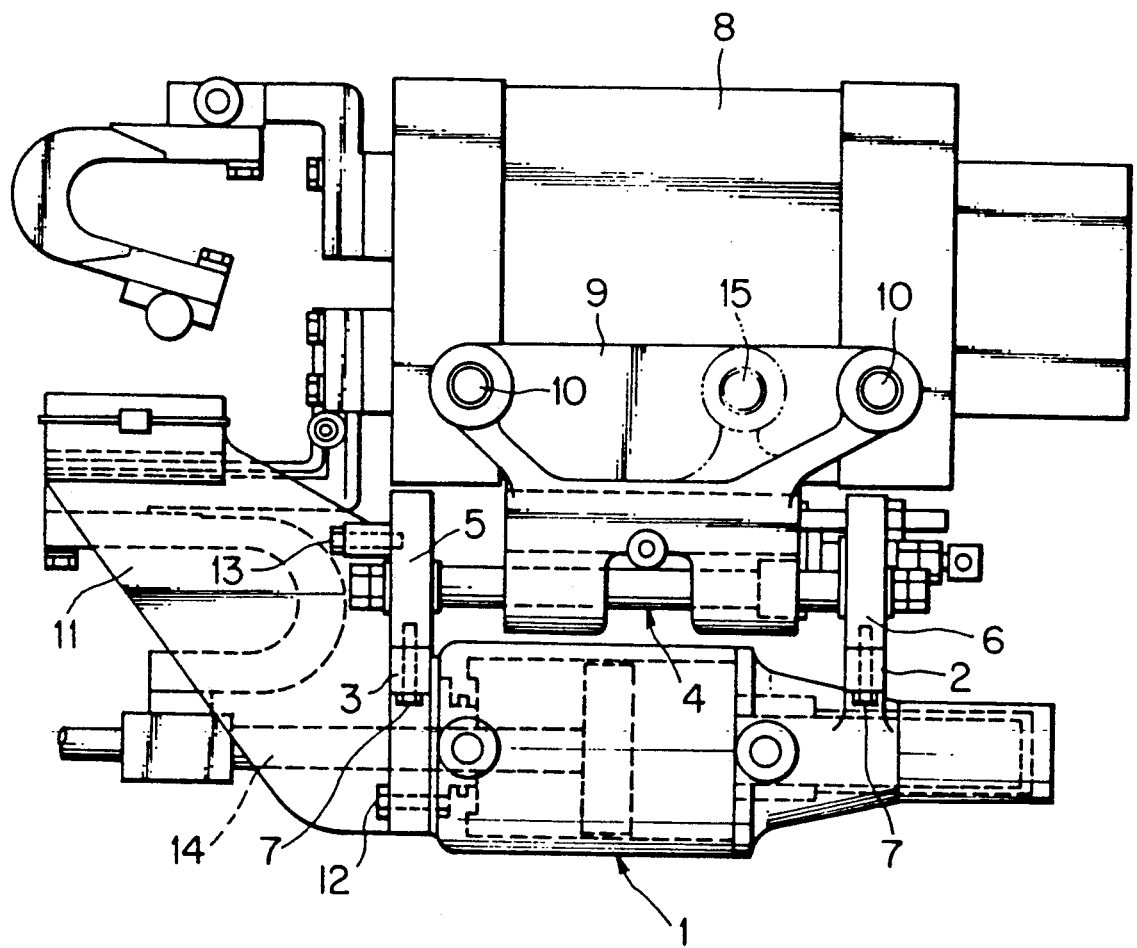
FIG. 1 is a side elevation of a main portion of a C-type welding gun according to a preferred embodiment of the present invention.
Figure 4:
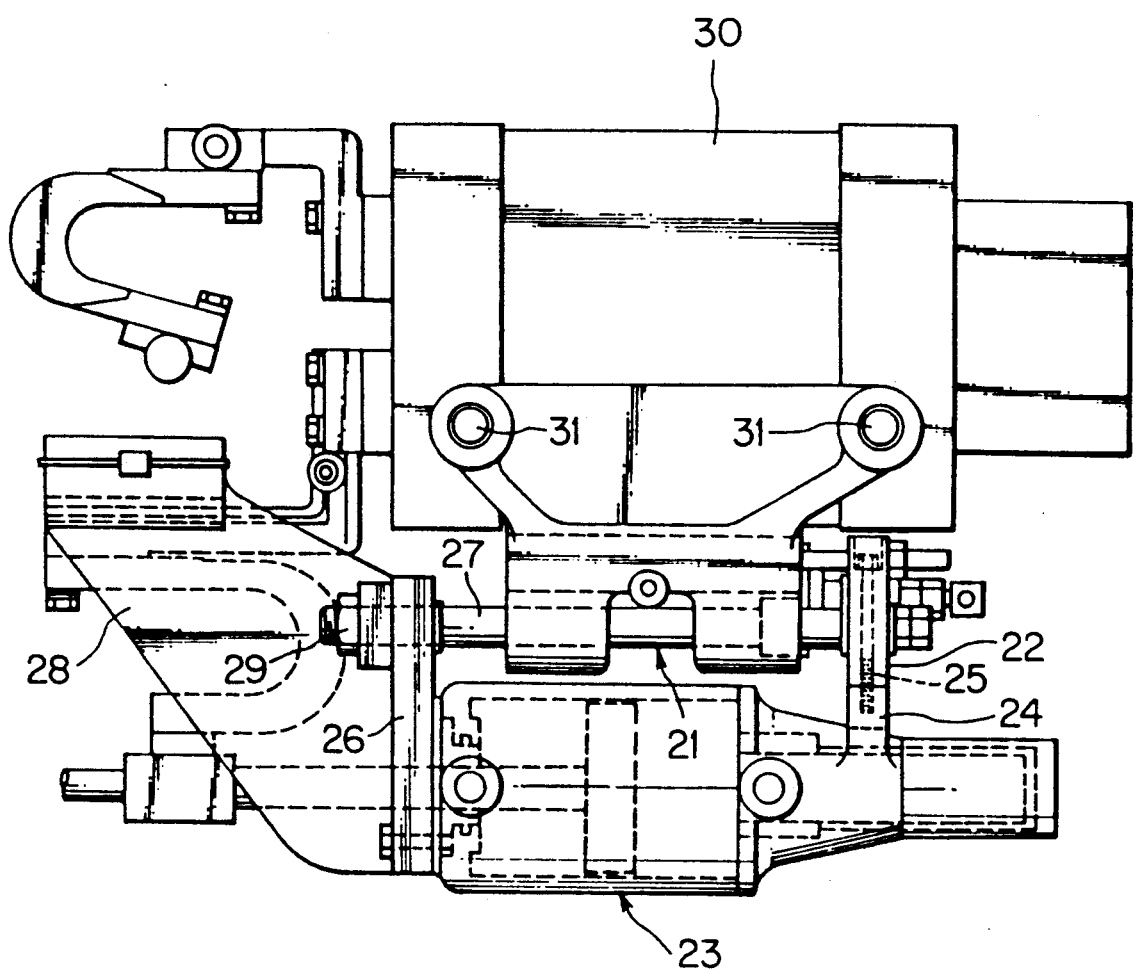
FIG. 4 is a side elevation of a main portion of a prior art C-type welding gun.

A C-type welding gun according to a preferred embodiment of the present invention will be described with reference to FIGS. 1 to 3.

A C-type welding gun comprising a welding transformer 8, an equalizer 4 for slidably holding the welding transformer, the equalizer being composed of a shaft, a welding transformer holding member 9 slidably mounted on the shaft, and front and rear walls 5, 6 respectively fixing the shaft therebetween, an air cylinder 1 fixed to the equalizer and having a piston rod 14, and a yoke 11 fixed to both the equalizer and the air cylinder 1, characterized in that each of the air cylinder 1, the equalizer 4, the welding transformer 8 and the yoke 11 is a separate unit or component, the welding transformer 8 being fixed to the transformer holding member 9 by screwing two bolts 10, 10 to the transformer holding member 9, the front and rear walls 5, 6 of the equalizer 4 being placed on T-shaped supporting plates 2, 3 mounted on the air cylinder 1 at front and rear portions thereof. The T-shaped supporting plates 2, 3 are fixed to the front and rear walls 5, 6 by screwing bolts 7, 7 upwardly through the supporting plates 2,3 and into the lower portions of the front and rear walls 5, 6. As shown in FIG. 2 the T-shaped support plates include a stem part 40 and a cap part 41. The yoke 11 is fixed to the equalizer 4 by screwing bolts 13, 13 to the front wall 5 of the equalizer 4 and is fixed to the air cylinder by screwing bolts 12, 12 to the front portion of the air cylinder 1.

The C-type welding gun will be described more in detail.

Upon actuation of the air cylinder 1 having the piston rod 14, an electrode (not shown) fixed to the free end of the piston rod 14 is moved toward or away from another electrode (not shown) by reciprocal movement of the piston. The supporting plates 2, 3 having T-shape in cross section are integrally mounted on air cylinder 1 at the front and the rear portions thereof.

The equalizer 4 is disposed over the air cylinder 1 and has the front and the rear walls 5, 6 for fixing the shaft of the equalizer 4 therebetween. These walls 5 and 6 are supported on the supporting plates 2, 3 of the air cylinder 1 and are screwed to the supporting plates by the bolts 7, 7 which extend upwardly into the lower portions of the walls 5 and 6.

The welding transformer 8 disposed over the equalizer 4 is held by the welding transformer holding member 9 slidably mounted on the shaft of the equalizer 4, and screwed by the bolts 10, 10 from the sides thereof.

The yoke 11 is fixed to the front portion of the air cylinder 1 by the bolts 12, 12 and to the front wall 5 of the equalizer 4 by the bolts 13, 13.

Each of the air cylinder 1, the equalizer 4, the welding transformer 8 and the yoke 11 is a separate unit or component.

An operation of the C-type welding gun having the structure set forth above will be described hereafter.

In case that any of the unit of the air cylinder 1, the equalizer 4, the transformer 8 and the yoke 11 is replaced with another unit of air cylinder, equalizer, welding transformer and yoke, e.g. in case the welding transformer 8 is replaced with another transformer, the bolts 10, 10 for fixing the welding transformer 8 to the welding transformer holding member 9 can be removed. Likewise, when the equalizer 4 is replaced with another equalizer, firstly the bolts 10, 10 for fixing the welding transformer 8 to the welding transformer holding member 9 are first removed, secondly the bolts 13, 13 for fixing the yoke 11 to the equalizer 4 are removed and thirdly the bolts 7, 7 for fixing the air cylinder to the equalizer 4 are removed. Particularly, when the air cylinder 1 is replaced with another air cylinder, firstly the bolts 12, 12 for fixing the yoke 11 to the air cylinder 1 are first removed and secondly the bolts 7, 7 for fixing the equalizer 4 to the air cylinder 1 are removed. Likewise, when the yoke 11 is replaced with another yoke, firstly the bolts 12, 12 for fixing the yoke 11 to the air cylinder 1 are first removed and secondly the bolts 13 for fixing the equalizer 4 to the yoke 11 are removed.

Although the transformer 8 is held by the welding transformer holding member 9 by screwing two bolts 10, 10 which are spaced at the both sides of the welding transformer supporting member 9, the welding transformer holding member 9 may have another bolt hole for screwing another bolt, as illustrated in imaginary line of FIG. 1, so that the welding transformer holding member 9 can fix and hold the welding transformer 8 irrespective of the size of the welding transformer 8.

According to the present invention, the transformer 8, the equalizer 4, the air cylinder 1 and the yoke 11 are respectively separate units and replaced with another one individually so that the optimum C-type welding gun can be selected in response to the variation of the work within a short period of time. Particularly, the air cylinder which is frequently replaced with another air cylinder, can be replaced with another one very easily. Furthermore, the equalizer always keeps its accuracy since the equalizer is not disassembled at the replacement of other units.

Although the invention has been described in its preferred form with a certain degree of particularity, it is to be understood that many variations and changes are possible in the invention without departing from the scope thereof.

What is claimed is:

1. A C-type welding gun, comprising:
   a plurality of individual and separate components;
   means for detachably interconnecting said components with each other to permit disassembly of said welding gun into said individual components;
   said plurality of individual components including:
      a fluid pressure cylinder having a slidably movable piston rod disposed therein for carrying a welding electrode,
      an equalizer supported on said fluid pressure cylinder, said equalizer including a pair of supports attached to said fluid pressure cylinder and upstanding therefrom in spaced relationship with one another, and a shaft supported on and extending between said supports,
      a welding transformer slidably supported on said equalizer shaft for slidable movement relative to said fluid pressure cylinder, and
      a yoke which is fixed relative to said fluid pressure cylinder and projects away therefrom; and
   detachment means for permitting said fluid pressure cylinder to be physically detached and separated from the remaining said interconnected components without physically detaching any of said remaining interconnected components from one another.

2. A welding gun according to claim 1, wherein said detachment means includes said fluid pressure cylinder having a pair of generally T-shaped support plates which have a stem part and a cap part, said stem part upstanding from said fluid pressure cylinder and said cap part adjoining said stem part in approximately perpendicular overlying relationship relative thereto, said supports being support walls which are respectively supported on top of said cap parts and detachably fastened thereto by a plurality of elongate threaded fasteners, said elongate threaded fasteners extending upwardly alongside said stem parts and through said cap parts into said supports walls, and said elongate threaded fasteners having tool engaging means which are freely accessible from below said cap parts for permitting detachment of said T-shaped support plates from said support walls.

3. A welding gun according to claim 2, wherein said equalizer includes a transformer holding member which is slidably supported on said shaft for sliding movement relative to said fluid pressure cylinder, said welding transformer being detachably fixed to said transformer holding member by a pair of elongate threaded fasteners.

4. A welding gun according to claim 3, wherein said welding transformer is detachably fixed to said transformer holding member by three of said elongate threaded fasteners.

5. A welding gun according to claim 3, wherein said yoke is detachably fixed to one of said support walls by a plurality of elongate threaded fasteners, said yoke also being detachably fixed to said fluid pressure cylinder by an elongate threaded fastener, said piston rod extending outwardly from one end of said fluid pressure cylinder to terminate in a free end, and said yoke projecting from said fluid pressure cylinder and said one support wall toward said free end of said piston rod.

6. A welding gun according to claim 5, wherein said fluid pressure cylinder is an air cylinder, said equalizer being disposed in generally overlying relationship relative to said air cylinder, and said welding transformer overlying said equalizer and said air cylinder.

* * * * *